United States Patent
Iszlai et al.

(10) Patent No.: US 7,739,489 B2
(45) Date of Patent: **\*Jun. 15, 2010**

(54) METHOD AND SYSTEM FOR AUTOMATIC DETECTION, INVENTORY, AND OPERATING SYSTEM DEPLOYMENT ON NETWORK BOOT CAPABLE COMPUTERS

(75) Inventors: Gabriel Iszlai, Toronto (CA); Sorin Silviu Iszlai, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 213 days.

This patent is subject to a terminal disclaimer.

(21) Appl. No.: 12/111,394

(22) Filed: Apr. 29, 2008

(65) Prior Publication Data

US 2008/0195640 A1    Aug. 14, 2008

Related U.S. Application Data

(63) Continuation of application No. 11/116,828, filed on Apr. 28, 2005, now Pat. No. 7,376,823.

(51) Int. Cl.
*G06F 15/177* (2006.01)
(52) U.S. Cl. .............................. 713/1; 713/2
(58) Field of Classification Search ...... 713/1, 713/2

See application file for complete search history.

(56) References Cited

U.S. PATENT DOCUMENTS

| | | | |
|---|---|---|---|
| 5,974,547 A | 10/1999 | Klimenko | |
| 6,487,601 B1 | 11/2002 | Hubacher et al. | |
| 6,601,096 B1 | 7/2003 | Lassiter, Jr. | |
| 6,681,323 B1 | 1/2004 | Fontanesi et al. | |
| 6,687,820 B2 | 2/2004 | French et al. | |
| 6,810,478 B1 | 10/2004 | Anand et al. | |
| 6,813,708 B2 | 11/2004 | Smith et al. | |
| 7,017,171 B1 | 3/2006 | Horlander et al. | |
| 7,222,359 B2 * | 5/2007 | Freund et al. | 726/3 |
| 7,234,053 B1 | 6/2007 | Mahmoud | |
| 7,376,823 B2 * | 5/2008 | Iszlai et al. | 713/1 |
| 7,536,539 B2 * | 5/2009 | Blanchard et al. | 713/2 |
| 2003/0018763 A1 | 1/2003 | Doherty et al. | |
| 2003/0097422 A1 | 5/2003 | Richards et al. | |
| 2003/0163680 A1 | 8/2003 | Wang et al. | |
| 2004/0049671 A1 | 3/2004 | Miyamoto et al. | |

(Continued)

OTHER PUBLICATIONS

Reich, "Method and Apparatus for a High Performance Operating System in a RIPL Environment", RD n443, Article 119, Mar. 2001, p. 457.

(Continued)

*Primary Examiner*—Chun Cao
(74) *Attorney, Agent, or Firm*—Yee & Associates, P.C.; Jeffrey S. LaBaw

(57) ABSTRACT

A system for the automatic detection and inventory of a network boot capable computer and for the automatic deployment of an appropriate operating system to the network boot capable computer. First, an initial broadcast packet from the network boot capable computer is received. In response to receiving the initial broadcast packet, a discovery kernel is sent to the network boot capable computer. The discovery kernel generates a hardware details file. The hardware details file is received from the network boot capable computer and is analyzed. After the hardware details file is analyzed, an appropriate operating system is deployed to the network boot capable computer.

11 Claims, 4 Drawing Sheets

U.S. PATENT DOCUMENTS

2004/0059900 A1 3/2004 Backman et al.
2004/0210646 A1 10/2004 Sushima et al.
2004/0254978 A1 12/2004 Ibanez et al.
2005/0028154 A1 2/2005 Smith et al.
2006/0005016 A1 1/2006 Lee et al.

OTHER PUBLICATIONS

Yamamoto et al., "JavaOS Multiple Boot Server (Win32) Support with Priority", RD n425, Article 42587, Sep. 1999, p. 1234.
USPTO Notice of allowance for U.S. Appl. No. 12/115,900 dated Jan. 4, 2010.

* cited by examiner

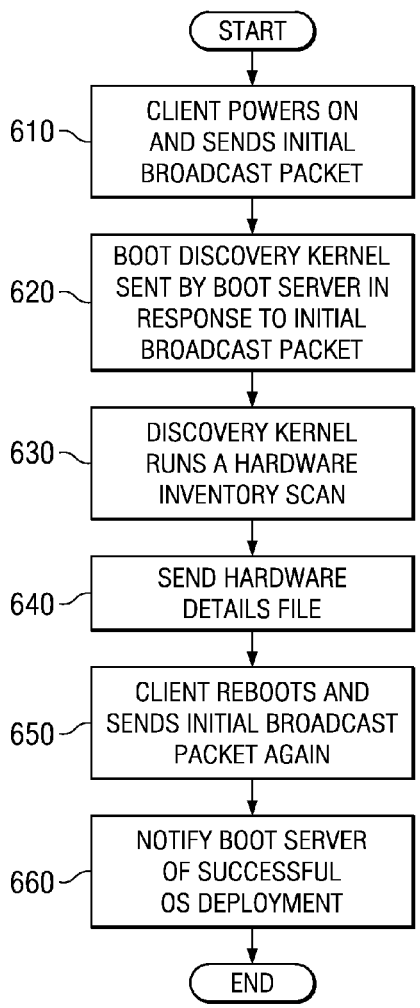
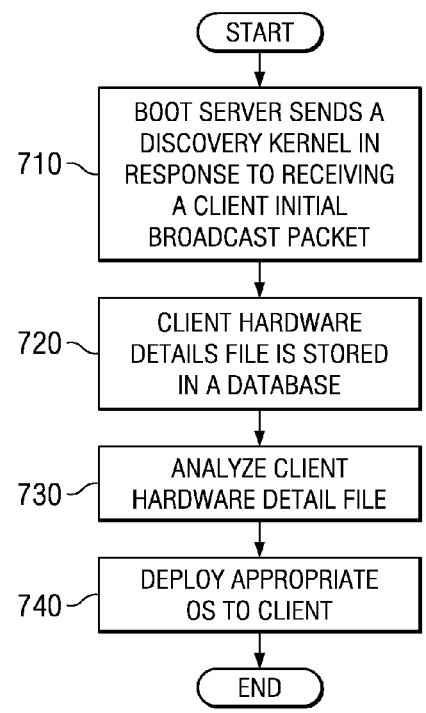

METHOD AND SYSTEM FOR AUTOMATIC DETECTION, INVENTORY, AND OPERATING SYSTEM DEPLOYMENT ON NETWORK BOOT CAPABLE COMPUTERS

This application is a continuation of application number Ser. No. 11/116,828, filed Apr. 28, 2005, status, allowed.

BACKGROUND OF THE INVENTION

1. Technical Field

The present invention relates to an improved data processing system. More specifically, the present invention is directed to a method, apparatus, and computer program product for the detection, inventory, and installation of an operating system on network boot capable computers.

2. Description of Related Art

A desktop management interface is a management system for personal computers developed by the Distributed Management Task Force. The desktop management interface, or DMI, provides a bi-directional path to interrogate all the hardware and software components within a computer. When computers are DMI-enabled, the hardware and software configurations of the computers may be monitored over a network from a central station.

A computer utilizing DMI technology has a memory-resident agent residing in the background of the operating system. When the DMI queries the agent, the agent will respond by sending back data contained in a management information file and/or activating a management information file routine. The management information file may contain static data, such as, computer model identification, serial number, memory and port addresses. A management information file routine may, for example, report errors to a management console as errors occur, or the management information file routine may scan read-only-memory or random-access-memory chips and report their contents, as well.

Wired for management (WfM) is a specification from the Intel™ Corporation for a computer that can be centrally managed in a network. The computer must be DMI compliant, be accessible by a management server prior to booting, contain instrumentation for component discovery and identification and include remote wake-up capabilities. A preboot execution environment (PXE) is an Intel™ WfM capability that enables a computer to boot from a server. PXE enables remote booting of an operating system; remote emergency booting of a diagnostic program; and remote new system startup, which will boot an installation program to install an operating system. PXE is supported in the basic input output system (BIOS). BIOS is an essential set of routines in a computer, which are stored on a chip and provides an interface between the operating system and the hardware. The operating system (OS) is the master control program that runs a data processing system. The OS starts and communicates with all software programs that run in the data processing system.

A dynamic host configuration protocol (DHCP) is a software program that automatically assigns internet protocol (IP) addresses to client stations logging onto a transmission control protocol/internet protocol (TCP/IP) network. An IP address is the address of a computer attached to an IP network. Every client and server station must have a unique IP address. A trivial file transfer protocol (TFTP) is a version of the TCP/IP file transfer protocol that has no directory or password capability.

For clarification, a client is a requesting machine and a server is a supplying machine, both of which are connected via a network. A client has either a permanent IP address or one that is dynamically assigned to a client when booted. DHCP eliminates having to manually assign permanent IP addresses to a client. DHCP software typically runs in servers and is also found in network devices, such as, integrated services digital network (ISDN) routers and modem routers that allow a multitude of users access to the Internet.

A bootstrap protocol (BOOTP) is a TCP/IP protocol used by a diskless workstation or network computer to obtain its IP address and other network information such as server address and default gateway. Upon startup, a client sends out a BOOTP request in a user datagram protocol (UDP) packet to the BOOTP server, which returns the required information.

A problem with existing remote inventory and deployment systems, such as, for example, Rembo™ Auto-Deploy Technology, International Business Machines™ Corporation's Remote Deployment Manager, or Microsoft™ Window Server 2003 Automated Deployment Services, is that the above listed systems are limited to supporting only one type of computer hardware or operating system. Another problem with current client/server management systems is that all information with regard to a client machine has to be input into a database manually by the system administrator using a graphical user interface (GUI) or by importing a file containing the required information.

Therefore, it would be advantageous to have an improved method and apparatus for the detection, inventory, and deployment of an operating system to network boot capable computers.

SUMMARY OF THE INVENTION

Embodiments of the present invention provide a method, apparatus and a computer program product for automatically detecting and inventorying a network boot capable computer. Further, the present invention provides a method, apparatus and a computer program product for automatically deploying an appropriate operating system to the network boot capable computer. The process starts when an initial broadcast packet from the network boot capable computer is received. In response to receiving the initial broadcast packet, a discovery kernel is sent to the network boot capable computer. The discovery kernel is loaded by the network boot capable computer and generates a hardware details file. The hardware details file is received from the network boot capable computer and is analyzed. Subsequent to the analysis of the hardware details file, an appropriate operating system is deployed to the network boot capable computer.

BRIEF DESCRIPTION OF THE DRAWINGS

The novel features believed characteristic of embodiments of the invention are set forth in the appended claims. The embodiments of the invention, as well as a preferred mode of use, further objectives and advantages thereof, will best be understood by reference to the following detailed description of an illustrative embodiment when read in conjunction with the accompanying drawings, wherein:

FIG. 6 is a flowchart illustrating an exemplary process for receiving an operating system from a boot server in accordance with an embodiment of the present invention; and FIG. 7 is a flowchart illustrating an exemplary process for deploying an operating system from a boot server to a client in accordance with an embodiment of the present invention.

DETAILED DESCRIPTION OF THE PREFERRED EMBODIMENT

Figure 1:
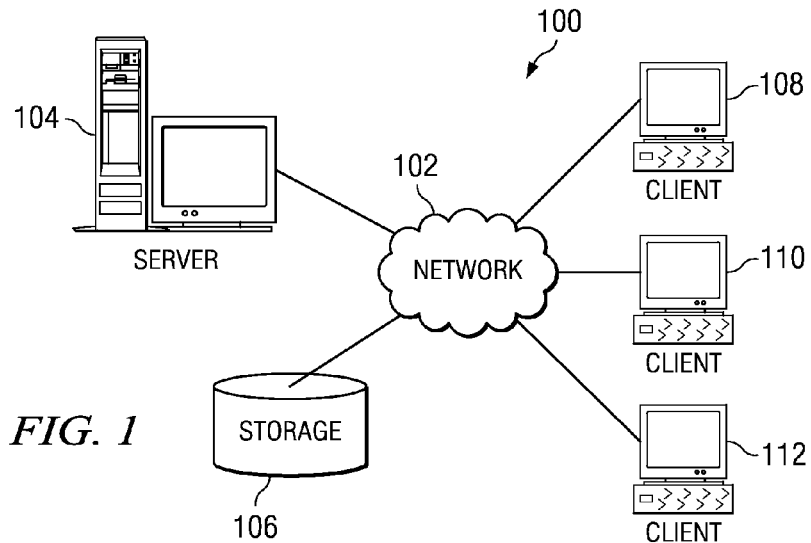
FIG. 1 is a pictorial representation of a distributed data processing system in which embodiments of the present invention may be implemented.

With reference now to the figures, FIG. 1 depicts a pictorial representation of a distributed data processing system in which embodiments of the present invention may be implemented. Distributed data processing system 100 is a network of computers in which an embodiment of the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108-112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for embodiments of the present invention.

Figure 2:
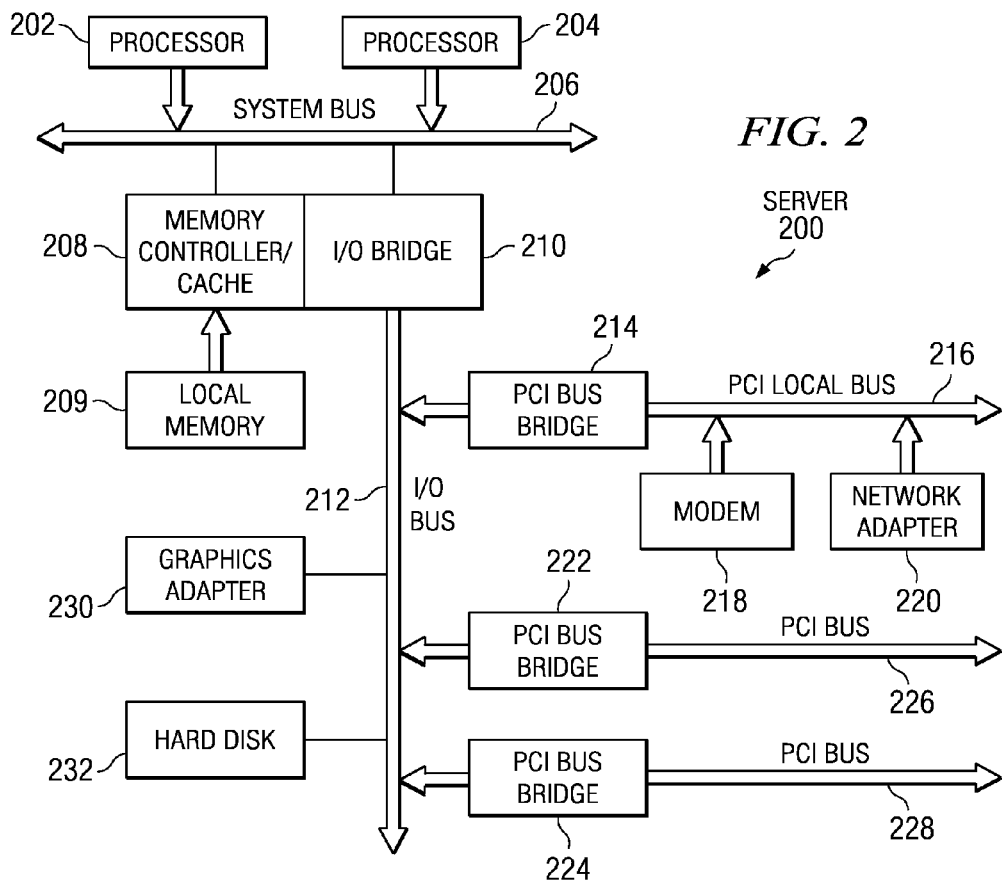
FIG. 2 is an exemplary block diagram of a data processing system that may be implemented as a server, such as a server in FIG. 1, in accordance with an embodiment of the present invention.

Referring to FIG. 2, a block diagram of a data processing system that may be implemented as a server, such as server 104 in FIG. 1, is depicted in accordance with an embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to an embodiment of the present invention.

The data processing system depicted in FIG. 2 may be, for example, an IBM™ eServer pSeries system, a product of International Business Machines™ Corporation in Armonk, N.Y., running the Advanced Interactive Executive (AIX™) operating system or the LINUX™ operating system.

Figure 3:
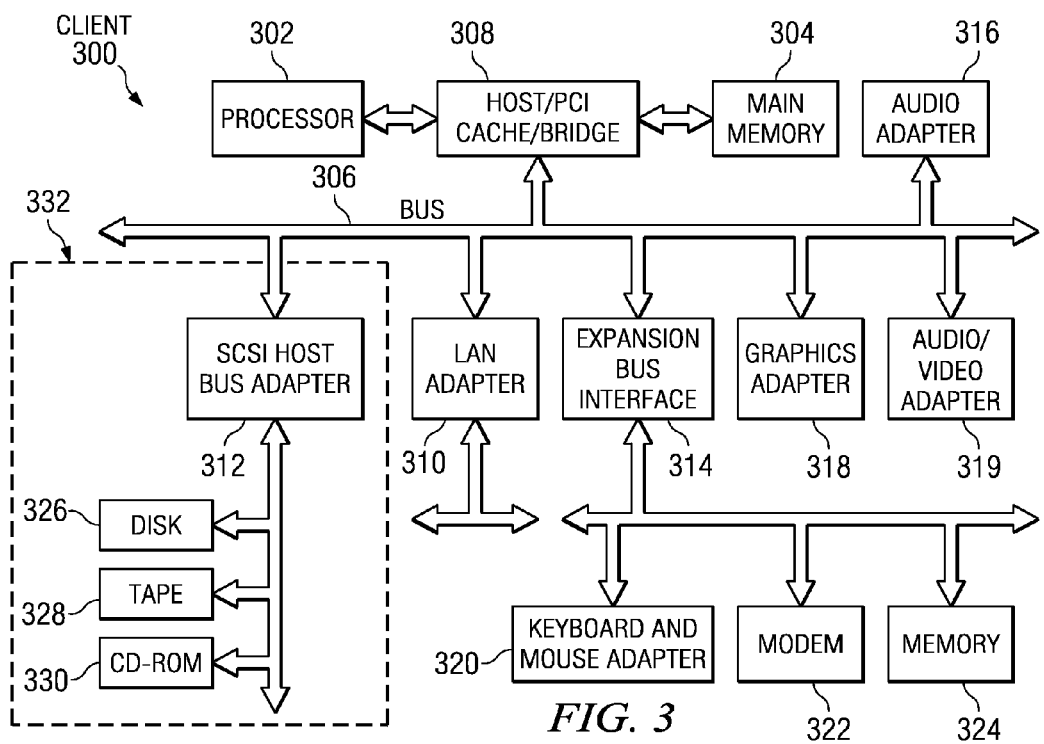
FIG. 3 is a block diagram illustrating a data processing system that may be implemented as a client, such as a client in FIG. 1, in accordance with an embodiment of the present invention.

With reference now to FIG. 3, a block diagram illustrating a data processing system in which an embodiment of the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows™ 2000, which is available from Microsoft™ Corporation. An object oriented programming system such as Java™ may run in conjunction with the operating system and provides calls to the operating system from Java™ programs or applications executing on data processing system 300. "Java" is a trademark of Sun Microsystems™, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of an embodiment of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

An embodiment of the present invention provides an improved method, apparatus, and computer implemented instructions for automatic detection and inventory of a network boot capable computer. Moreover, an embodiment of the present invention provides a method, apparatus and a computer program product for automatic deployment of an appropriate operating system to the network boot capable computer. To begin the process, an initial broadcast packet is received from the network boot capable computer. In response to receiving the initial broadcast packet, a discovery kernel is sent to the network boot capable computer. The discovery kernel is loaded by the network boot capable computer and generates a hardware details file of the network boot capable computer. The hardware details file is received from the network boot capable computer and is analyzed. After analyzing the hardware details file using a deployment policy, an appropriate operating system is selected and deployed to the network boot capable computer.

A feature of an embodiment of the present invention is that an embodiment of the present invention will make it possible to identify, inventory, and manage different computer platforms and different operating systems for a plurality of clients remotely from one central boot server. Examples of currently available computer hardware platforms produced by different manufacturers are Intel™'s x86 PC, IBM™'s iSeries (AS/400), Advanced Micro Devices™' Opteron™, Hewlett-Packard™'s 9000 series, and Sun Microsystem™'s SPARC™. Examples of currently available operating systems are IBM™ mainframe OS/390 and the AS/400's OS/400, the many versions of Windows™ (95, 98, NT, ME, 2000, and XP), versions of Unix™ (Solaris™ and Linux™), Hewlett-Packard™ HP/UX OS, and the Macintosh™ OS. A problem with existing remote inventory and deployment systems is that they are limited to supporting only one type of computer hardware or operating system.

An embodiment of the present invention has the ability to deploy multiple, heterogeneous operating systems based on the physical location of the client, even though all client systems have identical hardware. The client systems may be positioned in racks, shelves, etc., all having the same hardware. Information regarding the physical location of the client may be used to deploy a plurality of operating systems to a plurality of clients. The physical location of the client may be pre-configured in the boot server of an embodiment of the present invention based on the client's serial number, globally unique identifier (GUID), media access control (MAC) address, and the like. The serial number may be found on a sticker on the computer case of the client. Currently, commercial boot servers only have the ability to deploy one type of operating system to identical client hardware systems.

Another benefit of an embodiment of the present invention is that the system will drastically reduce the amount of time a datacenter administrator will spend identifying, inventorying, and installing diverse operating systems on a multitude of heterogeneous computers. A further feature of an embodiment of the present invention is that the identification and inventory of network computers will be completely automatic and not require human intervention. Yet another benefit of an embodiment of the present invention is that the boot server can be implemented on a commodity system with standard open source tools, such as, for example, PXE and DHCP.

Figure 4:
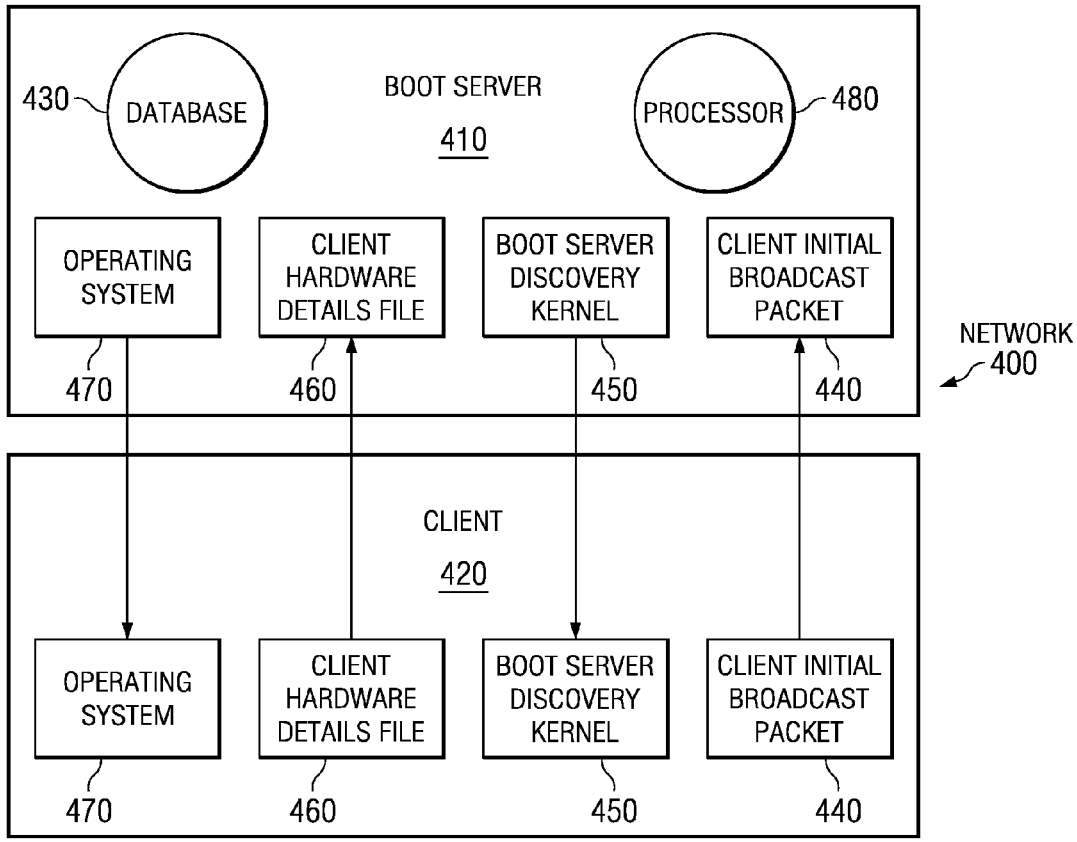
FIG. 4 is an exemplary block diagram which illustrates the exchange of information and software programs between a client and a boot server in accordance with an embodiment of the present invention.

Referring now to FIG. 4, an exemplary block diagram which illustrates the exchange of information and software programs between a client and a boot server in accordance with an embodiment of the present invention is shown. Network 400 is utilized to exchange the information and software programs between boot server 410 and client 420, for example, when server 104 exchanges information and programs with clients 108, 110, and 112 over network 102 in FIG. 1.

An embodiment of the present invention employs and utilizes the capabilities of a preboot execution environment (PXE) and a dynamic host configuration protocol/bootstrap protocol (DHCP/BootP) over network 400. PXE and DHCP/BootP are known protocols that enable a network computer to boot remotely from a server. For clarification, a boot server in this context is a server that used to implement an embodiment of the present invention. A client is a network computer or any other system that is capable of remote booting via a PXE environment or a DHCP/BootP environment. For example, an Intel™ computer is capable of remote booting via PXE and an IBM™, Advanced Micro Devices™, Hewlett-Packard™, or Sun Microsystem™ computer is capable of remote booting via DHCP/BootP. However, embodiments of the present invention are not restricted to the immediately preceding list of data processing systems or protocols. Any combination of compatible protocols and platforms capable of implementing the process of an embodiment of the present invention may be used.

It should be noted that an embodiment of the present invention may accommodate a plurality of clients powering on simultaneously. However, in the depicted example of FIG. 4, only one client is powered on. At power on, client 420 sends initial broadcast packet 440 over network 400 to boot server 410. Client initial broadcast packet 440 may contain information, such as, for example, manufacturer name or platform type. However, initial broadcast packet 440 may contain any basic information necessary for a boot server to utilize the system of an embodiment of the present invention.

In response to receiving client initial broadcast packet 440, boot server 410 sends discovery kernel 450 to client 420. A kernel is a fundamental part of a software program that typically is an operating system. Based on the information contained in client initial broadcast packet 440, boot server discovery kernel 450 will be an appropriate discovery kernel for the system of client 420.

Client 420 will then load boot server discovery kernel from the trivial file transfer protocol (TFTP) location specified in the response packet. Boot server discovery kernel 450, after being loaded by client 420, launches a hardware inventory scan of client 420. The inventory scan identifies the hardware components of client 420, such as, for example, client serial number, manufacturer, platform type, central processing unit type and speed, network interface card type, and memory capability.

Subsequent to the inventory scan, boot server discovery kernel 450 creates client hardware detail file 460. A specific example of the contents of client hardware detail file 460 is provided in the description of FIG. 5 below. Client hardware detail file 460 is sent by client 420 over a network file system (NFS), a file transfer protocol (FTP), or any other protocol capable of transferring client hardware detail file 460 to boot server 410 for analysis and storage. NFS is a file sharing protocol in a Unix™ network and FTP is a protocol that has directory or password capability.

Storage of client hardware detail file 460 may be provided by inventory database 430, such as, for example, local memory 209 in FIG. 2. However, client hardware detail file 460 may be stored in an inventory database of a different server or in a separate storage unit, such as, for example, storage 106 in FIG. 1. Further, storage of client hardware detail file 460 may be provided by more than one storage unit in the same or different locations or in any combination of the above. Still further, client hardware detail file 460 may be sent to a management system, such as, for example, the Tivoli™ Provisioning Manager, a product of International Business Machines™ Corporation in Armonk, N.Y., for storage and file management.

Analysis of client hardware detail file 460 may be accomplished by processor 480, such as, for example, processor 202 or 204 in FIG. 2. Analysis of client hardware detail file 460 is for the purpose of determining which operating system is to be deployed to client 420 from boot server 410. For example, after analysis of client hardware detail file 460 by processor 480, operating system 470 is deployed to client 420 from boot server 410. Analysis of client hardware detail file 460 by processor 480 is based on boot server 410 deployment policies.

Boot server 410 deployment policies may be based on, for example, the serial number or processor type of client 420. As a specific example, boot server 410 deploys to client 420, with serial number 140nz2jX, a RedHat™ operating system or boot server 410 deploys to client 420, with an Intel™ processor, a Windows™ operating system. In addition, deployment policies may be related to the location of a client in a data processing system. For example, a client in Rack-5, shelf-3 of data processing system OMEGA is deployed a Solaris™ operating system, whereas a client in Rack-8, shelf-11 of data processing system OMEGA is deployed a Hewlett-Packard™ UX operating system. It should be noted that a boot server utilizing the process of the present invention may have any kind or combination of deployment policies necessary to meet the requirements of the clients that it supports.

When client 420 boots from network 400, instead of from a local hard disk, boot server 410 makes decisions based on the information received from client 420 and on the pre-defined deployment policies. For example, client initial broadcast packet 440 and client hardware detail file 460 may indicate that client 420 is an Intel™ computer. Based on that information, boot server 410 may deploy a RedHat™ Linux™ AS 3.0 operating system customized for client 420.

Customization of the operating system specifically for client 420 may include, for example, IP address allocation, routing configuration, usernames and passwords or any combination thereof. However, customizing an operating system for a specific client or groups of clients is not limited to the immediately preceding list. A boot server employing the system of an embodiment of the present invention may customize the operating system in any manner necessary to meet the needs of a client.

As another example, client initial broadcast packet 440 and client hardware detail file 460 may indicate that client 420 is a SPARC™ computer. Based on that information, boot server 410 may deploy a Solaris™ operating system customized for client 420. Also, boot server 410 may group clients according to serial number, platform type, MAC address, GUID, or any combination thereof. In addition, based on identifying client groups, boot server 410 may automatically deploy different operating systems to the discrete groups of clients. It should be noted that boot server 410 may deploy the same operating system or a plurality of operating systems to clients.

Subsequent to boot server 410 determining an appropriate operating system for client 420, client 420 is rebooted and client initial broadcast packet 440 is sent again over network 400. Boot server 410, in response to receiving client initial broadcast packet 440 once again, automatically deploys, over network 400, customized operating system 470, which is to be installed on client 420. Operating system deployment may be performed by using specific technology, such as, for example, RedHat™ Kickstart, Solaris™ Jumpstart Automated Installation, and Microsoft™ Automated Deployment Services, for the selected operating system for the client. It should be noted that operating system deployment by the boot server may be to one or more clients simultaneously.

Client 420 notifies boot server 410 after successful operating system 470 deployment and installation. Boot server 410 may then notify a management system of the new status of client 420. If a management system is used, the continued status of client 420 may be monitored by the management system. Boot server 410 may continue to perform the inventory and deployment functions automatically.

Figure 5:
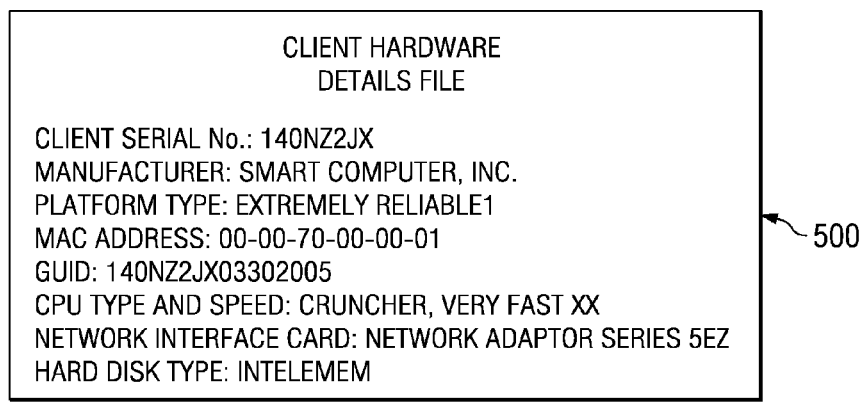
FIG. 5 is an exemplary pictorial illustration of the information contained in a client hardware details file in accordance with an embodiment of the present invention.

Turning now to FIG. 5, an exemplary pictorial illustration of the information comprising a client hardware details file is depicted in accordance with an embodiment of the present invention. Client hardware detail file 500, such as, for example, client hardware detail file 460 in FIG. 4, may comprise the following information: client serial number, manufacturer of the system, platform type, MAC address, GUID, central processing unit type and speed, network interface card, and hard disk type. However, it should be noted that client hardware detail file 500 may contain more or less information depending upon the requirements of a discovery kernel program sent to a client by a boot server utilizing the system of the present invention. For example, boot server discovery kernel 450 sent to client 420 from boot server 410 in FIG. 4. In addition, all of the information contained on client hardware detail file 500 may be associated with or identified by, for example, the client serial number or any other item of information necessary to identify the information with regard to that particular client hardware detail file.

With reference now to FIG. 6, a flowchart is shown illustrating an exemplary process for a client to receive an operating system from a boot server in accordance with an embodiment of the present invention. The process begins when a client powers on and sends an initial broadcast packet over a network to a boot server (step 610). For example, client 420 powers on and sends client initial broadcast packet 440 over network 400 to boot server 410 in FIG. 4.

The client will then launch a discovery kernel, such as, for example, boot server discovery kernel 450 in FIG. 4, sent to the client from the boot server in response to the boot server receiving the initial broadcast packet (step 620). Subsequent to the client launching the discovery kernel in step 620, the discovery kernel runs a hardware inventory scan (step 630). After the hardware inventory scan is performed by the discovery kernel in step 630, the client sends a hardware detail file (e.g., client hardware detail file 500 in FIG. 5) to the boot server over a network (step 640). For example, client 420 sends client hardware detail file 460 to boot server 410 over network 400 in FIG. 4.

Subsequent to the client hardware detail file being sent to the boot server in step 640, the client reboots and sends an initial broadcast packet to the boot server once again (step 650). In response to receiving the initial broadcast packet once again from the client in step 650, the boot server deploys an appropriate operating system to the client over the network. For example, boot server 410 deploys operating system 470 over network 400 to client 420 in response to receiving client initial broadcast packet 440 in FIG. 4 a second time. Finally, the client sends notification to the boot server that the deployment and installation of the operating system was successful (step 660). The process terminates thereafter.

Referring now to FIG. 7, a flowchart illustrating an exemplary process for deploying an operating system from a boot server to a client is depicted in accordance with an embodiment of the present invention. The process begins when a boot server sends a discovery kernel over a network to a client in response to receiving an initial broadcast packet from the client after client powers on (step 710). For example, boot server 410 sends boot server discovery kernel 450 over network 400 to client 420 in FIG. 4.

The discovery kernel runs a hardware scan of client. A client hardware detail file is generated by the discovery kernel and is sent by the client to the boot server. Subsequently, the client hardware detail file is stored in a database (step 720), such as, for example, client hardware detail file 460 is stored in database 430 of boot server 410 in FIG. 4. In addition to storing the client hardware detail file in the database in step 720, the information contained in the client hardware detail file, such as, for example, the information contained in client hardware detail file 500 in FIG. 5, is analyzed according to a predetermined deployment policy. Boot server deployment policies are discussed in the detailed description of FIG. 4 above. Analysis of the information contained in the client hardware detail file is performed by a processor in the boot server for the purpose of determining an appropriate operating system for deployment to the client (step 730). For example, processor 480 in boot server 410 analyzes client hardware detail file 460 in FIG. 4.

Subsequent to the boot server analyzing the data contained in the client hardware detail file and determining the appropriate operating system for the client in step 730, the boot server deploys the operating system, such as, for example, operating system 470 in FIG. 4, to the client over the network (step 740). It should be noted that steps 710-740 may be performed by the boot server simultaneously for a plurality of clients. The process terminates thereafter.

Thus, embodiments of the present invention provide a method, apparatus and computer program product for automatically detecting and inventorying a network boot capable computer and for automatically deploying an appropriate operating system to the network boot capable computer. The process starts when an initial broadcast packet is received from the network boot capable computer. In response to receiving the initial broadcast packet, a discovery kernel is sent to the network boot capable computer. The discovery kernel is loaded by the network boot capable computer and generates a hardware details file of the network boot capable computer. The hardware details file is received from the network boot capable computer and is analyzed. After analyzing the hardware details file using a deployment policy, an appropriate operating system is selected and deployed to the network boot capable computer.

A problem with currently existing systems is that existing systems are limited to supporting only one type of computer hardware or operating system. Embodiments of the present invention overcome this problem by making it possible for at least one central boot server to remotely identify, inventory, and manage a plurality of heterogeneous computer platforms and a plurality of heterogeneous operating systems for a plurality of clients. Also, embodiments of the present invention may reduce the amount of time a datacenter administrator spends identifying, inventorying, and installing diverse operating systems on a multitude of heterogeneous computers. Further embodiments of the present invention using the identification and inventory of network computers may be completely automatic reducing human intervention. Still further, the boot server used by the system of an embodiment of the present invention may be implemented on a commodity data processing system with standard open source tools, such as, for example, PXE and DHCP.

It is important to note that while embodiments of the present invention have been described in the context of a fully functioning data processing system, those of ordinary skill in the art will appreciate that the processes of embodiments of the present invention are capable of being distributed in the form of instructions or computer usable program code embodied in a computer usable medium and a variety of forms and that embodiments of the present invention applies equally regardless of the particular type of signal bearing media actually used to carry out the distribution. The computer usable program code comprises instructions and/or data. Examples of computer usable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer usable media may take the form of coded formats that are decoded for actual use in a particular data processing system.

The description of embodiments of the present invention have been presented for purposes of illustration and description, and are not intended to be exhaustive or limited to the embodiments of the invention in the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated.

What is claimed is:

1. A central boot server comprising:
   a bus system;
   a memory connected to the bus system, wherein the memory includes a set of instructions; and a processing unit connected to the bus system, wherein the processing unit executes the set of instructions to receive an initial broadcast packet from a network boot capable computer, wherein the initial broadcast packet includes basic system hardware information regarding the network boot capable computer, send an appropriate discovery kernel to the network boot capable computer based on the basic system hardware information included in the initial broadcast packet wherein the appropriate discovery kernel is specific to system hardware for the boot capable computer, receive a hardware details file generated by the discovery kernel from the network boot capable computer, analyze the hardware details file, and deploy an appropriate operating system from a plurality of operating systems available from the central boot server to the network boot capable computer upon receiving the initial broadcast packet again after analyzing the hardware details file, wherein the appropriate operating system is customized specifically for the network boot capable computer by the central boot server.

2. The central boot server of claim 1, wherein the network boot capable computer is a client.

3. The central boot server of claim 1, wherein the basic system hardware information included in the initial broadcast packet is one of a manufacturer name or a platform type.

4. The central boot server of claim 1, further comprising:
a database for storing the hardware details file from the network boot capable computer.

5. The central boot server of claim 1,
wherein the set of instructions to receive, send, analyze, and deploy are executed by the central boot server for a plurality of network boot capable computers simultaneously.

6. A computer program product for automatic detection and inventory of a network boot capable computer and for automatic deployment of an appropriate operating system to the network boot capable computer by a central boot server, the computer program product comprising:
a computer-usable recordable medium having computer usable program code embodied therein, the computer-usable recordable medium comprising:
computer usable program code configured to receive an initial broadcast packet from the network boot capable computer, wherein the initial broadcast packet includes basic system hardware information regarding the network boot capable computer;
computer usable program code configured to send an appropriate discovery kernel to the network boot capable computer based on the basic system hardware information included in the initial broadcast packet, wherein the appropriate discovery kernel is specific to system hardware for the boot capable computer;
computer usable program code configured to receive a hardware details file generated by the discovery kernel from the network boot capable computer;
computer usable program code configured to analyze the hardware details file; and
computer usable program code configured to deploy an appropriate operating system from a plurality of operating systems available from the central boot server to the network boot capable computer upon receiving the initial broadcast packet again after analyzing the hardware details file, wherein the appropriate operating system is customized specifically for the network boot capable computer by the central boot server.

7. The computer program product as recited in claim 6, wherein the hardware details file comprises at least one of a serial number, a manufacturer name, a platform type, a media access control address, a global unique identifier, a central processing unit type and speed, a network interface card name, and a hard disk type.

8. The computer program product as recited in claim 6, further comprising:
computer usable program code configured to determine the appropriate operating system for the network boot capable computer using a predetermined deployment policy.

9. The computer program product as recited in claim 6, further comprising:
computer usable program code configured to store the hardware details file from the network boot capable computer in a database.

10. The computer program product as recited in claim 6, wherein the computer usable program code is configured to receive an initial broadcast packet from the network boot capable computer, send a discovery kernel to the network boot capable computer in response to receiving the initial broadcast packet, and deploy an appropriate operating system to the network boot capable computer in at least one of a preboot execution environment and a dynamic host configuration protocol/bootstrap protocol.

11. The computer program product as recited in claim 6, wherein the computer usable program code is configured to deploy an appropriate operating system to the network boot capable computer using at least one of a serial number, a manufacturer name, a platform type, a media access control address, a global unique identifier, a central processing unit type and speed, a network interface card name, and a hard disk type.

* * * * *